US010654309B1

(12) United States Patent
    Baston

(10) Patent No.: US 10,654,309 B1
(45) Date of Patent: May 19, 2020

(54) PORTABLE DOCUMENT HOLDER AND METHOD OF USE

(71) Applicant: Robert W. Baston, South Holland, IL (US)

(72) Inventor: Robert W. Baston, South Holland, IL (US)

( * ) Notice: Subject to any disclaimer, the term of this patent is extended or adjusted under 35 U.S.C. 154(b) by 0 days.

(21) Appl. No.: 16/208,753

(22) Filed: Dec. 4, 2018

(51) Int. Cl.
    *G09F 21/04* (2006.01)
    *B42F 7/06* (2006.01)
    *F16B 1/00* (2006.01)
    *B60R 11/00* (2006.01)

(52) U.S. Cl.
    CPC .............. *B42F 7/065* (2013.01); *B60R 11/00* (2013.01); *F16B 1/00* (2013.01); *B60R 2011/0021* (2013.01); *B60R 2011/0057* (2013.01); *F16B 2001/0035* (2013.01)

(58) Field of Classification Search
    CPC . G09F 21/04; G09F 3/20; B60R 7/046; B60R 7/06; B60R 7/04; A45C 11/18
    USPC ........................................ 224/277, 482, 483
    See application file for complete search history.

(56) References Cited

U.S. PATENT DOCUMENTS

| | | | | |
|---|---|---|---|---|
| 3,665,355 | A * | 5/1972 | Sasaki | H01F 7/0215 335/306 |
| 6,782,998 | B2 | 8/2004 | Koren | |
| 9,795,338 | B2 | 10/2017 | Kim | |
| 2008/0127534 | A1 | 6/2008 | Brown | |
| 2014/0373987 | A1 | 12/2014 | Ming | |
| 2018/0025675 | A1* | 1/2018 | Sparks | G09F 3/207 224/585 |
| 2018/0151093 | A1* | 5/2018 | Willis | G09F 3/201 |

OTHER PUBLICATIONS https://www.ebay.com/bhp/vehicle-business-card-holder.
https://www.ebay.com/itm/Source-One-Outdoor-Vehicle-Business-Ca.
https://www.ebay.com/itm/Clear-Magnetic-Vehicle-business-Holder-f.
https://www.ebay.com/bhp/outdoor-brochure-holder.
https://www.amazon.com/Business-Exterior-Included-Pictures-S1-O.
https://www.ebay.com/item/Outdoor-Vehicle-Brochure-Holder-8-5-X1.

* cited by examiner

*Primary Examiner* — Adam J Waggenspack
(74) *Attorney, Agent, or Firm* — Adrienne B. Naumann

(57) ABSTRACT

The document holder described herein is portable and comprises tangible document compartments for reversible insertion of tangible documents. Each tangible document compartment preferably attaches to an integral uppermost holder layer while it horizontally and laterally aligns with each remaining adjacent tangible document compartment. The document holder is flexible and comprises magnetic components and attaching components that reversibly attach to a curved surface or a flat surface. When initially attached to an interior curved or flat vehicle surface, the document holder is rapidly manually removed and reattached to the exterior curved or flat surface of the same vehicle. A third person exterior to the vehicle may then read or access the tangible documents without a driver or passenger manually retrieving the documents from the vehicle's interior.

5 Claims, 8 Drawing Sheets

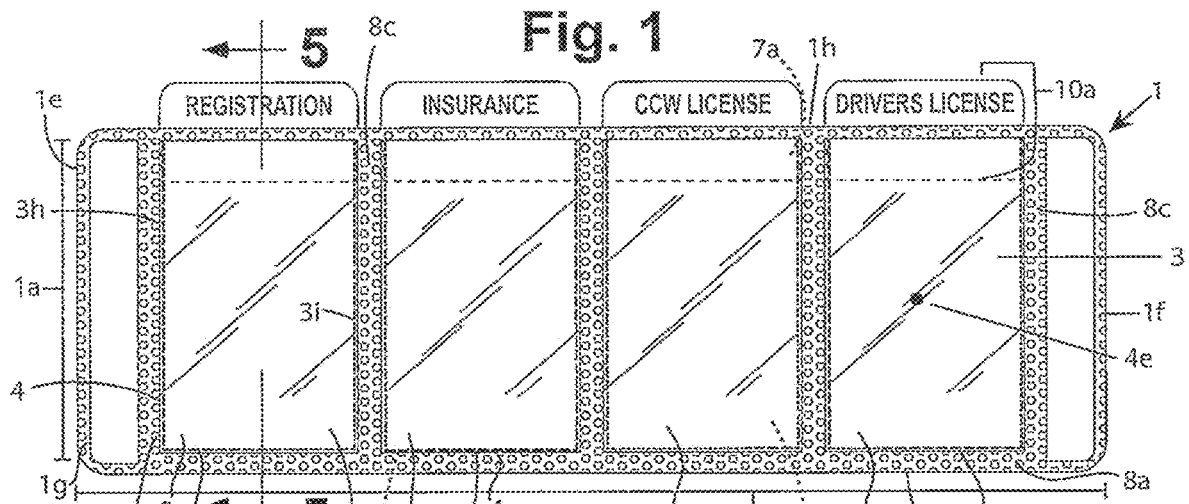
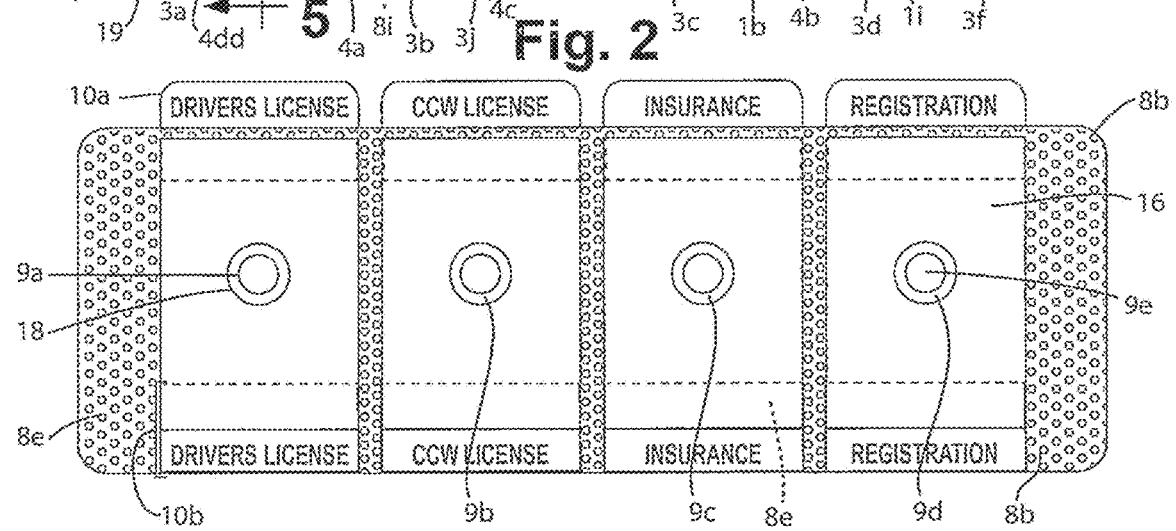
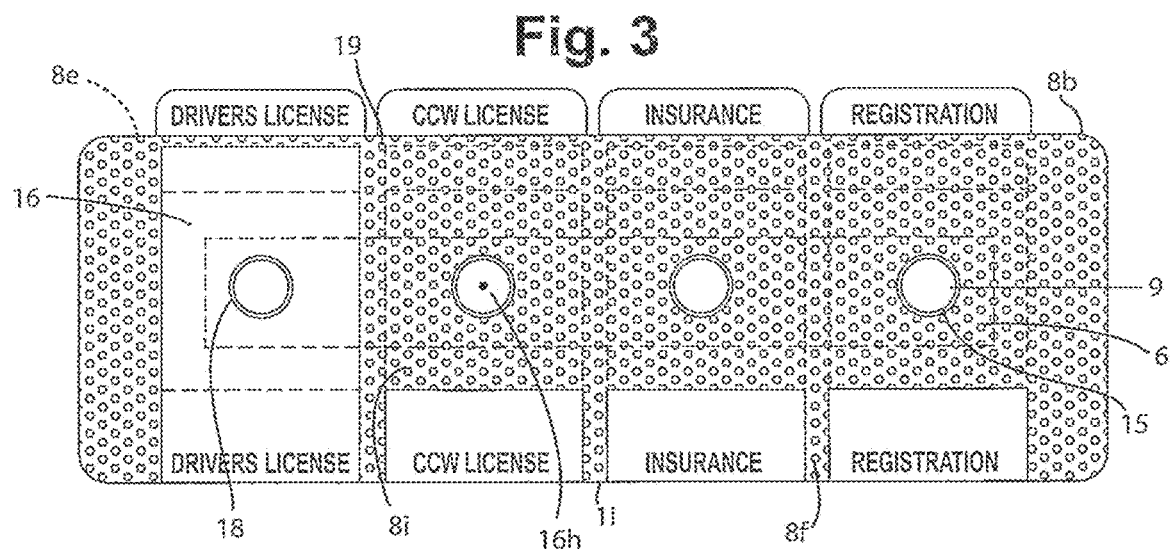

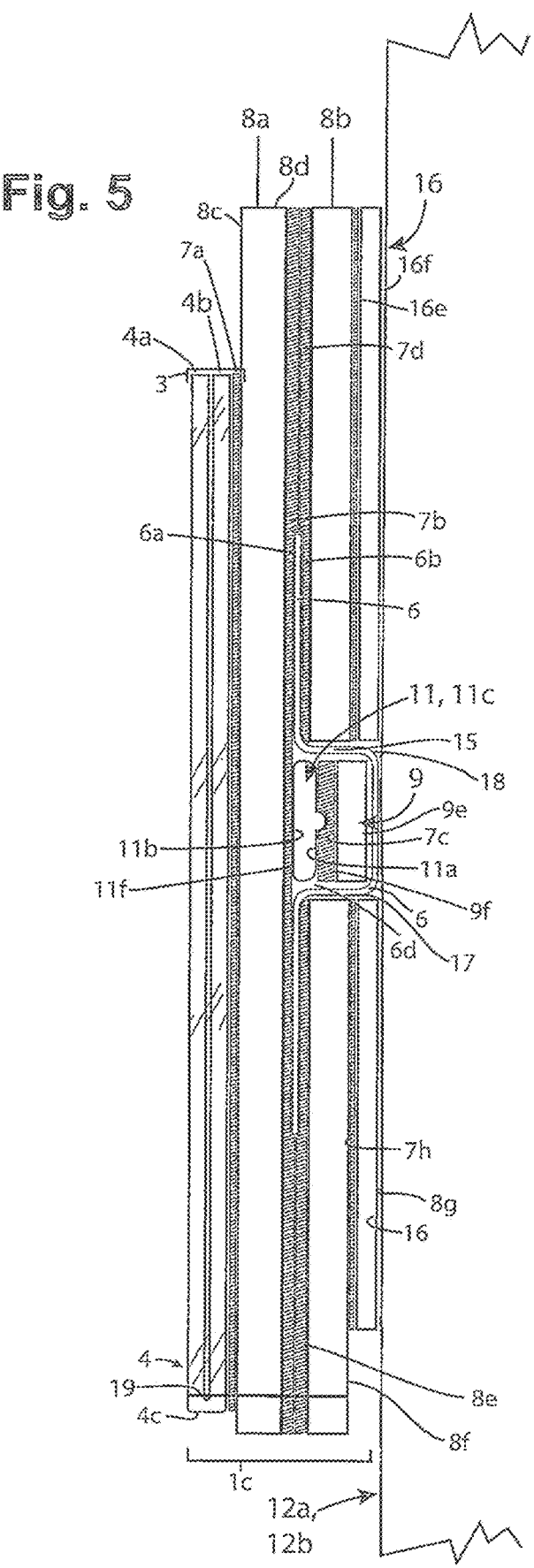

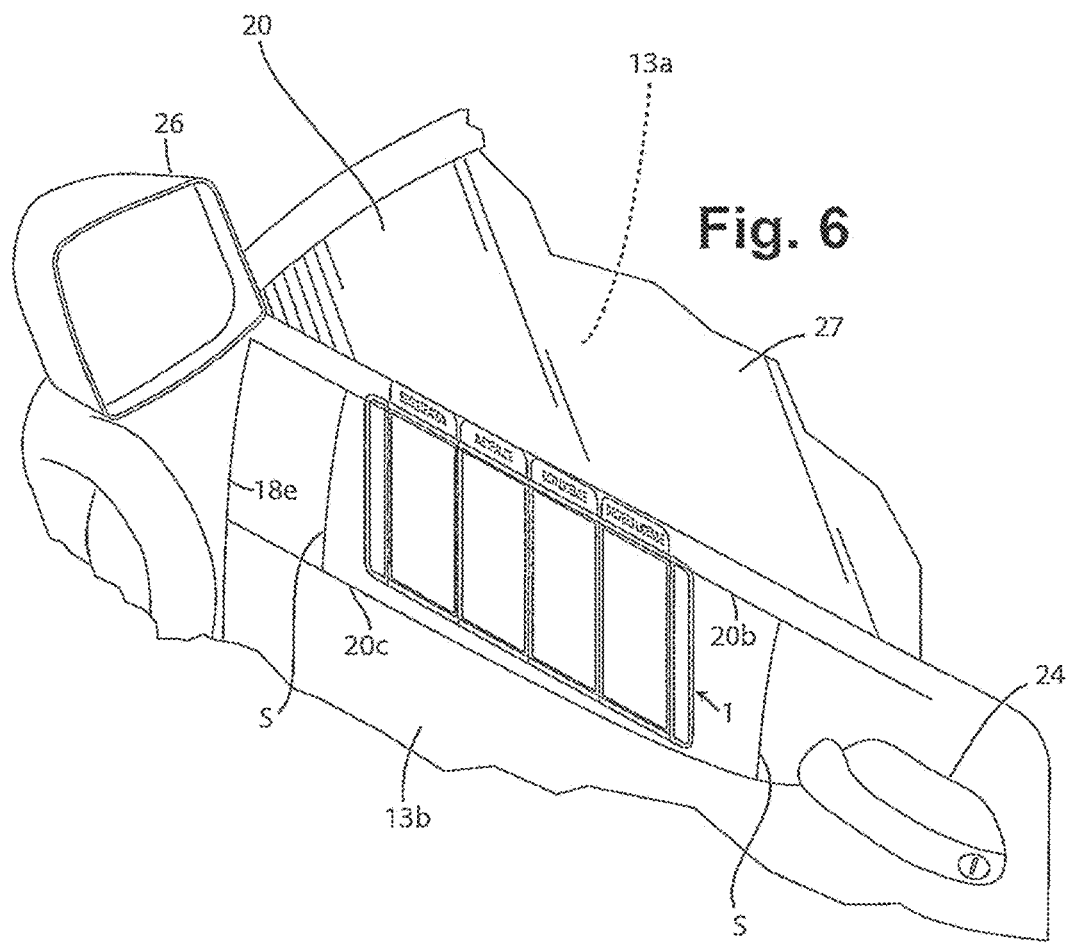
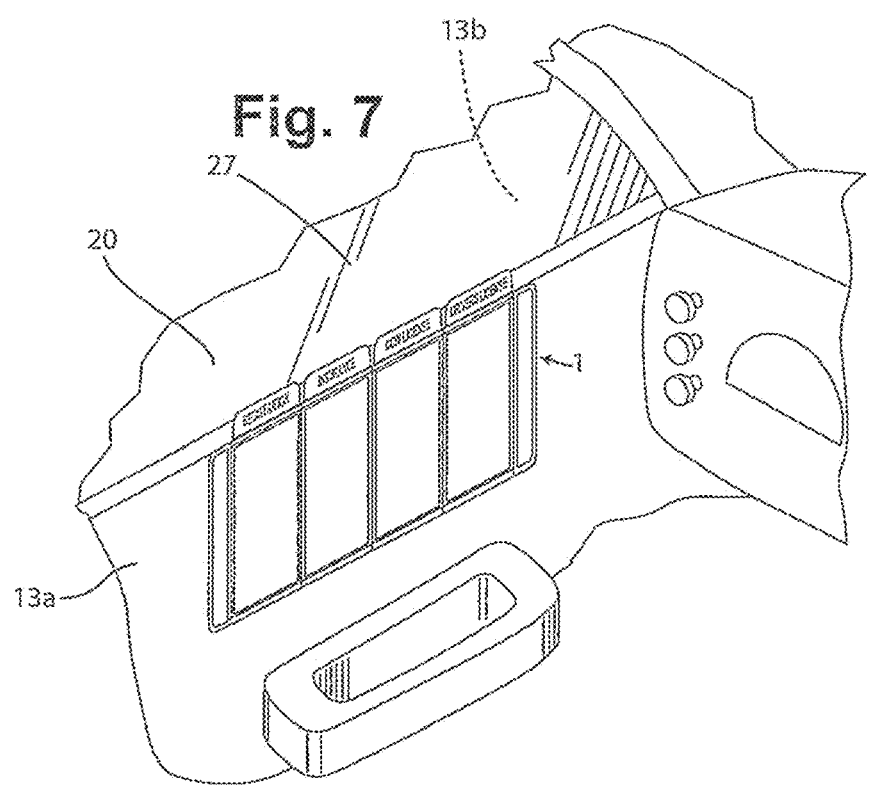

Fig. 8A
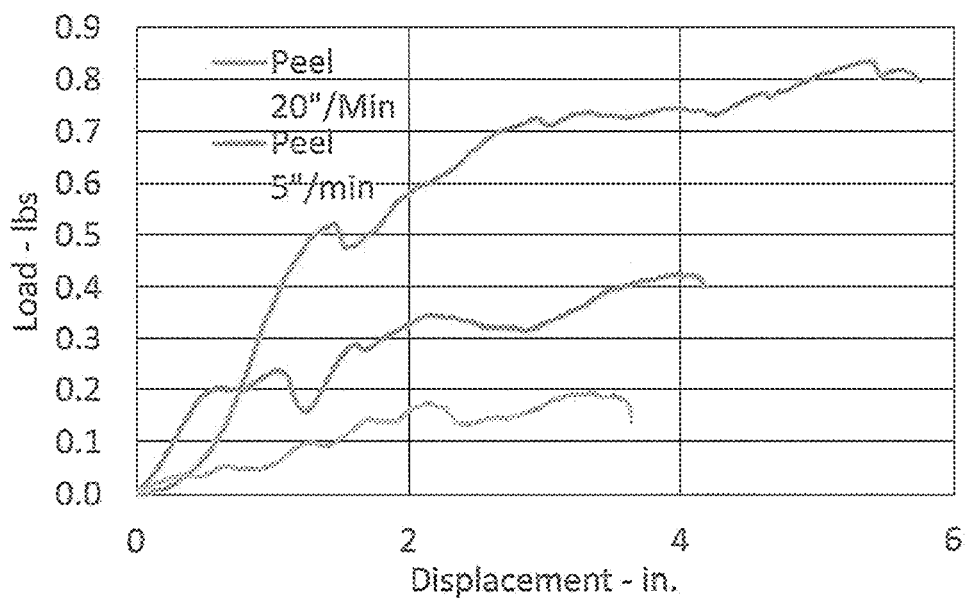
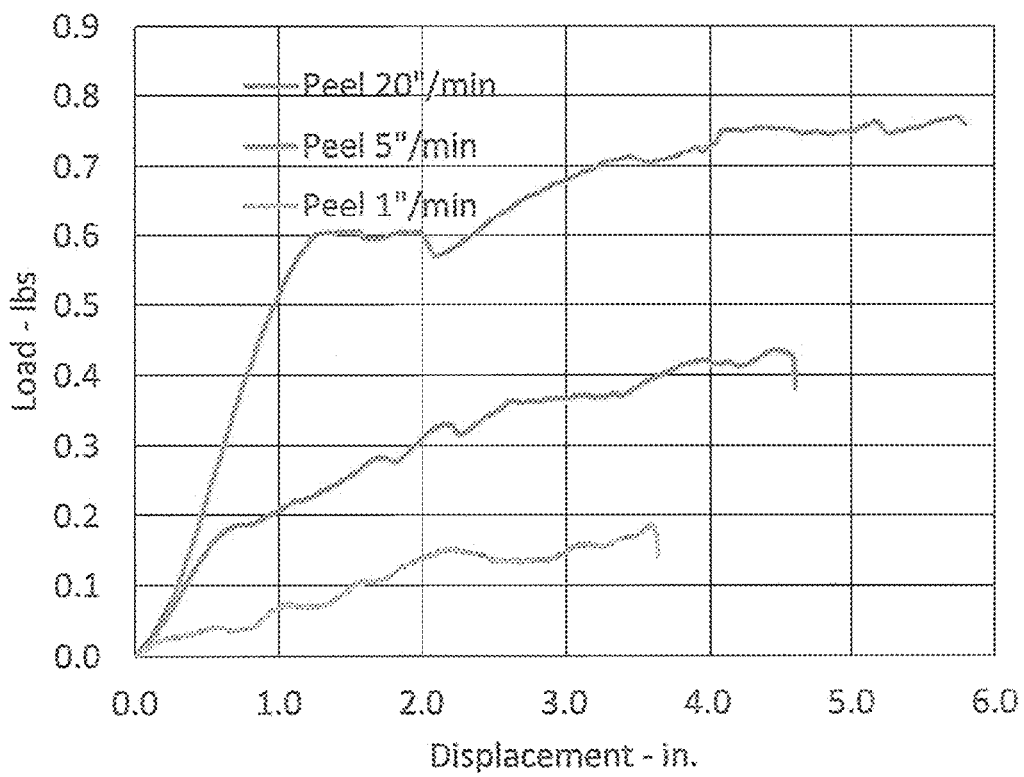

Fig. 8B
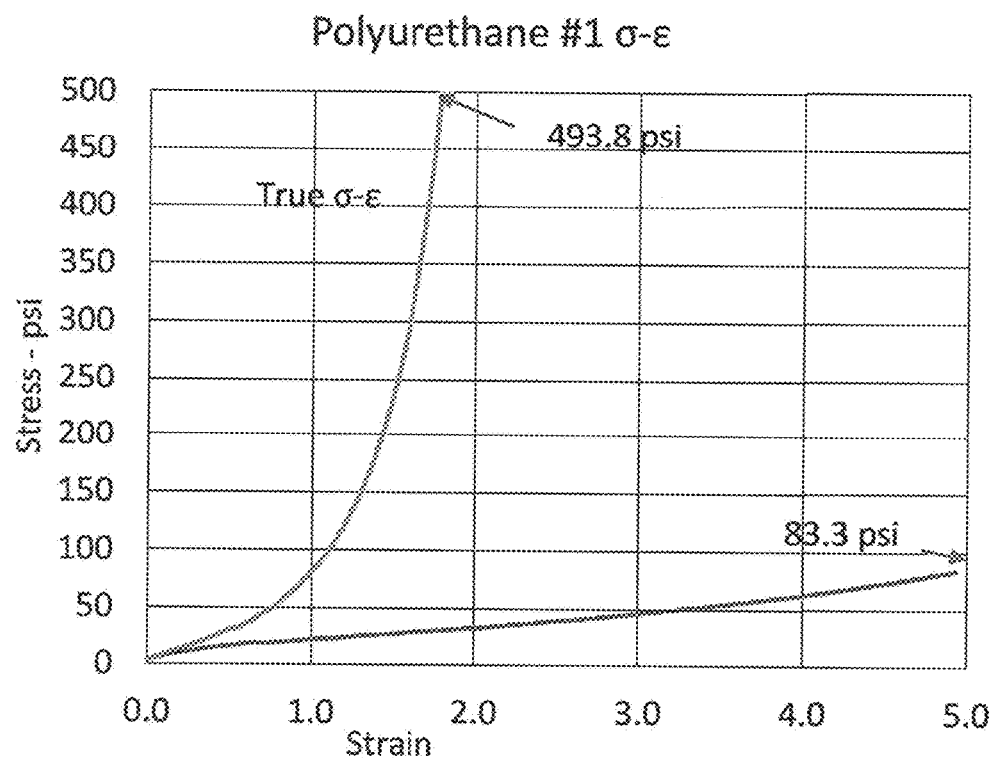
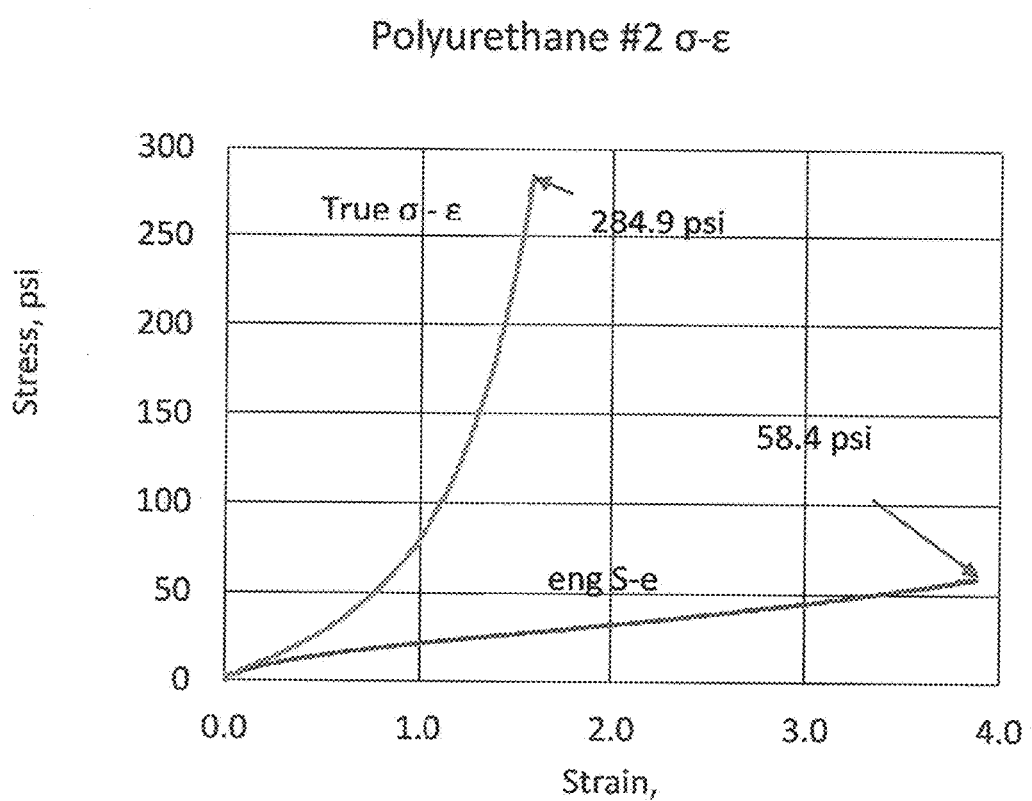

Fig. 9A

| Name | Value |
|---|---|
| Database Abbreviation | HPX |
| Database Title | IR - Polymers, Hummel Industrial - Wiley |
| Record ID | 1174 |
| Name | poly(ether urethane) based on poly(oxypropylene) and methylene-bis(4-phenylisocyanate) with few NCO groups |
| Comments | HUMMEL DECIMAL NUMBER= 14865; Description= APPEARANCE=colorless, somewhat turbid solution (68-72 wt. % in xylene, toluene or butanone) |
| InChI | InChI=1S/C13H18N2O4.C2H3NO/c1-9(18-3)8- |
| InChIKey | IIDLSIACAJEMCX-UHFFFAOYSA-N |
| Source of Sample | Henkel |
| Synonyms | Cuvertin UL 0251 |
| Technique | film on CsI, dried for 15 hours at 50C in vacuo |

PORTABLE DOCUMENT HOLDER AND METHOD OF USE

BACKGROUND

The disclosed invention generally relates to a portable document holder from which inserted tangible documents may be quickly and manually retrieved. More particularly, this invention relates to portable flexible document holder that reversibly and repeatedly attaches to a flat or curved surface and where the flat or curved surface comprises any one of a number of diverse materials. This invention further relates to a portable flexible document holder which (i) reversibly and repeatedly attaches to a curved surface or flat even surface whenever that surface is subjected to weather exterior, and where (ii) the document holder flexibly and reversibly reverts to its original physical configuration and dimensions whenever no external force(s) acts upon it.

More particularly this invention relates to a document holder that reversibly and repeatedly attaches to a vehicle interior flat or curved surface so tangible documents inserted within the document holder are easily viewed by a third person positioned exterior to this same vehicle. Even more particularly, this invention relates to a document holder which reversibly and repeatedly attaches to a vehicle interior curved or flat surface, and thereafter is rapidly manually and reversibly transferred to a vehicle exterior curved or flat surface for view by a third person positioned exterior to the same motor vehicle.

The document holder disclosed herein preferably reversibly attaches to an interior or exterior surface of a building, fixture or vehicle. In particular, this document holder reversibly attaches to a steering wheel, dashboard, or other vehicle interior surface. In those states where a vehicle owner may attach devices to a dashboard, the cardholder may reversibly and repeatedly attach to a windshield interior surface. For law enforcement officials observing through a driver's side door window, the disclosed document holder provides an improved means for submitting vehicle related information without or use of the driver's or passenger's or law enforcement official's hands. The preferred document holder preferably displays tangible documents within transparent horizontally aligned substantially transparent compartments for this purpose.

In the most preferred utility the method of use comprises
(i) the initial reversible attachment of the document holder to an interior vehicle surface during routine driving and parking activities, but which is
(ii) thereafter manually removed from the interior vehicle surface and immediately
(iii) attached to the same vehicle's exterior curved or flat surface immediately below the driver side window.

In this manner, after the third person's arrival at the driver's vehicle door, such as a law enforcement officer, the requested tangible documents are already displayed upon the exterior surface of the vehicle door. Neither the driver nor the passenger requires further manual activity or display of hands and arms for the third person to read or otherwise observe the documents within the horizontal aligned compartments of the document holder.

Furthermore, after the third person departs the driver may then quickly reach through the vehicle window and detach the document holder device from the exterior vehicle surface. The driver may then rapidly and securely attach the document holder to the steering wheel or other easily observed and accessible vehicle interior surface.

Previous document holders, and especially those which are designated for use with motor vehicles, do not solve reading or access of tangible documents by third persons exterior to a motor vehicle. In particular, previous card holders do not require a driver or exterior third person at the exterior of a vehicle to easily and rapidly view or physically access written information
  (i) Within a vehicle interior, or
  (ii) along an exterior vehicle surface, and
  (iii) in an easily readable accessible position with all tangible documents simultaneously readable and retrievable in a lateral configuration.

For example, U.S. Patent App. Pub. No. US 2008/0127543 A1 (Brown) discloses a message card holder along a windshield adjacent to a dashboard. The card holder's posterior surface includes a non-slip or adhesive strip which contacts the dashboard and prevents the holder from sliding whenever the vehicle turns. However, Brown does not disclose structural features for reversibly attaching to a vehicle exterior surface or any other interior surface, and where this exterior surface generally comprises a painted metal. Furthermore, unlike this holder, the disclosed card holder does not comprise adhesives, as explained infra.

U.S. App. Pat. No. US 2014/0373987 A1 (Ming) disclose a card holder which is reversibly secured to a safety belt, and the belt is clasped between opposing portions of the card holder. However, Ming does not disclose structural features by which to reversibly attach and remove his card holder to a vehicle interior surface or a vehicle exterior surface without clasps or other metal attaching devices.

U.S. Pat. No. 9,796,338 (Kim) discloses a card holder that is secured to a vehicle interior structures such as a console, dashboard or armrest. However, this card holder cannot be removed from these interior surfaces and thereafter manually, rapidly and securely attached to the exterior surface of a vehicle door. U.S. Pat. No. 6,782,998 (Koran) discloses a credit card holder displaying flexing of inserted cards for easy removal from protective holders. However, this credit card holder does not comprise structural features by which to reversibly attach to either an interior or exterior curved or flat surface in a flexible manner. U.S. Pat. App. No. US 2008/0127534 A1 (Brown) disclose a card holder which is both supported upon and fastened to a vehicle dashboard with non-slip or adhesive strips. However, the document holder disclosed herein does not comprise adhesive strips for reversible and repeated attachment to a flat or curved surface.

Amazon discloses a card holder that adheres to a vehicle exterior surface with a peeling strip but without means to reversibly attach or re-attach either an interior vehicle surface, an exterior vehicle surface or other surfaces which do not comprise part of a vehicle. https://www.amazon.com/Business-Exterior-Included-Pictured-S1-O . . . (Jul. 16, 2018). Ebay discloses business card and brochure holders that attach to exterior vehicle surfaces by, although not exclusively, detachable mounting plates and adhesive tape pads, mounting brackets, exposed magnets, adhesive strips, Velcro® hook and loop fasteners, and suction cups. See https://www.ebay.com/bhp/vehicle-business-card-holder (Aug. 6, 2018). Still other card holders require clips to attach to a vehicle interior surface. https://www.bing.com/images/search/view+detailV2&ccid=bYrpkjvT. . . . Other card holders comprise a single compartment that suspends from a rearview mirror or self-adheres to a vehicle window interior surface. https://www.mvparkingpermpit.com/prking-permit-holders?engine=m. . . .

None of the previously existing card holders described supra accomplishes all of the following as does my novel document holder:

(i) display of tangible documents in a lateral manner so a third person exterior to the vehicle may easily read them without manual activity by a person within the vehicle or this third person, (ii) display of tangible documents upon curved metal surfaces after the document holder's reattachment thereto, (iii) absence of scratching, residue or otherwise marring of the painted finish on these curved metal surfaces after repeated attachments and removal of the document holder, (iv) repeated reversible attachment to any curved or flat surface surface, (v) with absence of any adhesive component, and (vi) attachment to an exterior vehicle driver's side door surface after previous attachment to an interior vehicle surface within approximately five seconds.

Furthermore, none of the above previously existing card holders are structurally adapted to (i) be sufficiently illuminated for observation and reading during adverse weather and nighttime conditions; and (ii) attach to surfaces made of one or more of a number of diverse materials, and (iii) without assistance from additional mechanical or adhesive attachments.

The document holder described herein preferably retrofits to any curved or flat surface on either the interior or exterior of a motor vehicle, and even when the surface exhibits moisture or otherwise contains debris. The presence of both sticky segments and magnets as described infra, and which comprise the surface of the document holder that contacts an adjacent non-holder surface, insures that attachment is independent of the properties of materials comprising this adjacent non-holder surface. This feature is particularly important when the driver attaches the document holder to a driver's side door exterior surface (i) within no more than five seconds and (ii) where vehicle surfaces are not necessarily free from dust, other debris, and are not necessarily flat.

In sum, Applicant's invention by virtue of its physical features, and combined materials behavior, is not limited to use in either a vehicle interior or exterior surface. Instead, it can be securely yet reversibly attached to vehicle surfaces, as well as other surfaces which do not comprise part of a vehicle. In part because of its combination of adhesive and magnetic attaching features, the document holder can be used in any building, motor vehicle or outdoor structure because of (i) attachment to curved or flat surfaces,
(ii) in any weather conditions,
(iii) in a repeated reversible manner,
(iv) attachment upon a surface for an indefinite time period, and/or thereafter removed and attached to a second surface for an indefinite time period.

SUMMARY OF THE INVENTION

The document holder disclosed herein preferably comprises a partially rectangular shape, and the longitudinal length is preferably longer than the width or depth/thickness of the document holder. Each document holder comprises a first lateral edge and a second lateral edge, a bottommost edge and an uppermost edge. Each lateral edge is also preferably adjacent to a segment of florescent tape, so the document holder and its contents are immediately visualized by the driver or a third person located exterior to the vehicle.

The document holder described herein preferably comprises a plurality of tangible document compartments. Preferably a driver's license, registration, insurance documents or another tangible document are each placed in a corresponding single tangible document compartment and thereby easily viewed. Each tangible document compartment upper surface is preferably made of a flexible and integral flat transparent or translucent flexible sheet segment. This segment is preferably folded to create an anterior sheet side and a posterior sheet side. Each transparent flexible sheet segment preferably (i) adheres to an uppermost holder layer and (ii) comprises a running stich along its longitudinal and bottommost compartment edges. Each running stitch preferably penetrates and thereby attaches document holder components to each other. Each transparent flexible sheet segment and each tangible document component is preferably physically discontinuous and distinct from remaining laterally aligned tangible document compartments. However, the uppermost holder layer of the document holder is preferably flexible, integral and continuous so each tangible document compartment comprises a corresponding portion of the uppermost holder layer as a posterior compartment backing.

Each tangible document compartment comprises a sufficient longitudinal length, width and depth so that a typical document comprising vehicle related information is (i) easily manually removed and reinserted into a corresponding compartment, or (ii) easily read while remaining within its respective compartment. Preferably each compartment is bordered at its bottommost edge and/or uppermost edge by tab(s) bearing tangible document descriptors in large letters. Most preferably there are at least four compartments for tangible documents such as: registration, concealed weapon carrier license, vehicle insurance and a driver's license. Optionally there is a florescent segment which illuminates the document holder and the inserted tangible documents. These florescent segments are preferably each adjacent to a corresponding holder's lateral edge along the anterior uppermost layer surface.

Each tangible document compartment preferably horizontally and laterally aligns with remaining adjacent tangible document compartments. In this manner, tangible documents are viewed through a preferably transparent surface without removal from tangible document compartments. Preferably each clear flexible holder segment attaches to the anterior uppermost layer surface at its posterior compartment side with both adhesive and the running stitch.

In addition to a preferably single flexible integral continuous uppermost holder layer, my document holder preferably comprises a single one-piece integral continuous flexible lowermost holder layer. Both uppermost and lowermost holder layers preferably return to their original physical dimension(s) and configuration(s) whenever there are no longer external forces acting upon them. Lowermost holder layer preferably comprises an anterior lowermost holder layer surface and a posterior lowermost holder layer surface. Lowermost holder layer and uppermost holder layer preferably exhibit flexible behavior but with appropriate stiffness to support inserted tangible documents in a horizontal and lateral manner upon an adjacent attaching surface.

Preferably adhered to the posterior surface of the uppermost holder layer are a series of snap fasteners that horizontally and laterally align with each other. Each snap fastener is adhered to the lowermost surface of a corresponding single magnet, and which most preferably comprises a single ring disk magnet that is equidistantly laterally aligned with adjoining single ring disk magnets. Each ring disk magnet is also preferably located at the center point of each corresponding congruently aligning tangible document compartment. Preferably each ring disk magnet is also vertically aligned with the snap fastener or similar device that adheres to the posterior uppermost holder layer surface.

Each magnet is covered and enclosed by a single flexible thin strip, and each enclosed magnet protrudes into and beyond the adjoining posterior lowermost holder layer surface. Preferably this magnet is a ring disk magnet. This single flexible thin strip is preferably rectangular, continuous and covers each laterally aligned magnet. Preferably adhered to posterior lowermost holder layer surface is a series of physically distinct and equidistantly spaced non-adhesive sticky segments which horizontally and laterally align with each other. However, in some embodiments a single sticky segment may continuously extend across, or comprise the same dimensions as, the posterior lowermost holder layer surface. Sticky segments with alternative shapes, configurations, numbers or positions along posterior lowermost holder layer surface are also possible. Each sticky segment preferably corresponds to a single congruently aligned tangible document compartment along the anterior uppermost holder layer surface.

Preferably a single magnetic ring disks protrudes through a single congruently aligned opening within a single corresponding sticky segment so that each magnetic ring disk covered by the flexible thin strip is flush with the posterior surfaces of each sticky segment. Together these flush magnetic upper surfaces and sticky segment posterior surface creates a smooth and continuous even surface that continuously and directly contacts a physically separate curved or flat surface. With these surface components physically contacting another physical distinct flat or curved surface, my document holder will indefinitely and reversibly attach to, although not exclusively, glass, paint, metal, vinyl and rigid plastics.

To use the document holder disclosed herein for motor vehicle traffic stops, the driver initially attaches the document holder to any convenient surface on the vehicle interior such as the steering wheel, driver side car door below a window, dashboard, sun visor, or console between the driver and passenger seats. For optimal viewing by a third person positioned exterior to the vehicle at the driver's door, the document holder is placed within the vision line of this third person while the document holder remains within the vehicle interior.

However, in the most preferred method of use the document holder is attached to (i) a vehicle steering wheel or (ii) the vehicle dashboard immediately anterior the driver's seat. Upon the eminent arrival of the third person at the driver's side door, the driver lowers the window of the driver's side vehicle door, rapidly removes the document holder from the vehicle interior surface, and reattaches it to the driver's door exterior surface just below the window.

Removal of the document holder from its previous position within the vehicle, and reattachment in the horizontal orientation to read upon the exterior car door surface, should not last more than five seconds. The ability to complete these movements manually within this time frame depends in large part upon:

(i) dimensions of the document holder,
(ii) weight of the tangible inserted documents
(iii) flexibility of the document holder,
(iv) reversible attachment of the sticky segments, and
(v) magnets attaching to a metal door with an exterior painted and waxed surface that is not necessarily free of moisture, debris or indentations.

Preferably my document holder comprises document identifying tabs and fluorescent strips for improved viewing during adverse weather conditions and nighttime driving.

Accordingly, one purpose of the invention to provide a manner in which to display and read tangible documents simultaneously in lateral alignment.

Another purpose of the invention is the reversible attachment of a document holder to a curved or flat surface, and even if the surface exhibits dust, debris, abrasions or any kind of moisture.

Another purpose of the invention is to provide a document holder that is portable, and which does not require additional structure features, mechanical attachments, or adhesive for attachment to an adjacent contacting surface that does not comprise the document holder.

Another purpose of the invention is to provide a document holder that reversibly and directly manually attaches to an interior vehicle surface and thereafter is removed and reattached to an exterior vehicle surface.

Another object of the invention is to provide a document holder that displays at tangible documents, and where these tangible documents are directly observable and readable by a third person positioned exterior to a vehicle.

These and other goals of the invention will become apparent from the attached drawings and detailed description of the preferred embodiments and other embodiments, infra.

IN THE DRAWINGS

FIG. 1 is an anterior view of the preferred embodiment of the invention.

FIG. 2 is a posterior view of the preferred embodiment of FIG. 1.

FIG. 3 is a posterior view with three sticky segments removed and the posterior lowermost layer surface exposed in the preferred embodiment of FIG. 1.

FIG. 5 is a lateral sectional view through one ring disk magnet of the preferred embodiment of FIG. 1.

FIG. 6 is a view of the preferred embodiment of FIG. 1 attached to the exterior surface of the vehicle driver's door and parallel to the vehicle driver's door window exterior lateral lowermost edge.

FIG. 7 is a view of the preferred embodiment of FIG. 1 attached to the vehicle driver's door lowermost window lateral interior edge.

FIGS. 8A and 8B comprise graphical representations of peel and stress/strain values for two samples of the most preferred material for sticky segments.

Figure 9B:
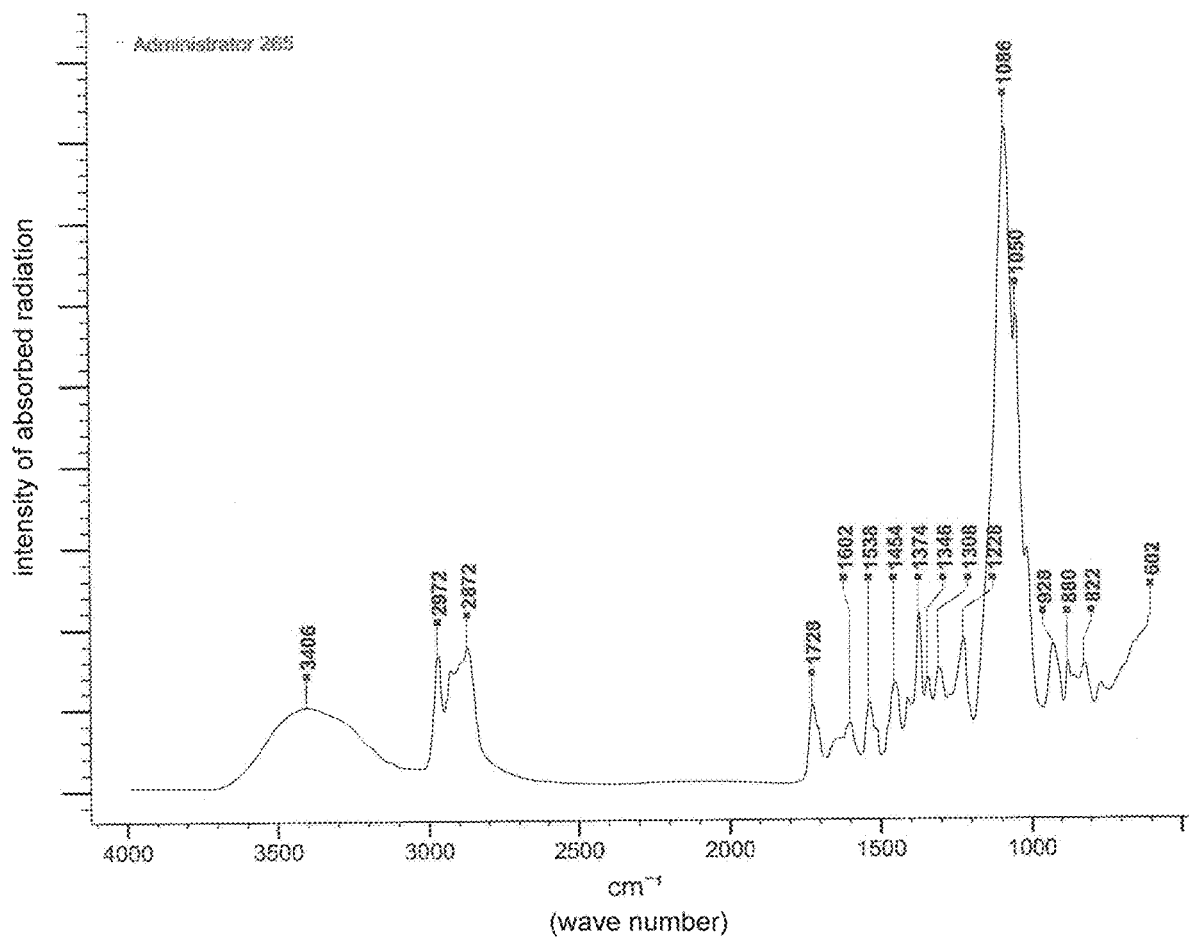

FIGS. 9A and 9B comprise a material composition data table and spectrum of the most preferred material for sticky segments.

DETAILED DESCRIPTION OF THE PREFERRED EMBODIMENT AND OTHER EMBODIMENTS

Referring initially to FIGS. 1, 2 and 5, document holder 1 is preferably portable, rectangular in shape, and document holder width 1a is preferably less than document holder longitudinal length 1b. Document holder depth (thickness) 1c is also preferably less than document holder width 1a.

Preferably a single document holder 1 is approximately (i) three and ⅞ inches in document holder width 1a, (ii) eleven and ½ inches in holder longitudinal length 1b (iii) at least ⅝ inch in thickness 1c, and (iv) five and ½ ounces in weight.

Each document holder 1 preferably comprises a first lateral edge 1e and a second lateral edge 1f, an uppermost edge 1h and a lowermost edge 1i. Preferably each lateral edge 1e, 1f is adjacent to a corresponding segment of florescent tape 1g along anterior uppermost layer surface 8c, (see infra) so document holder 1 and its contents are visually clear in poor lighting. Preferably but optionally, each document holder 1 comprises uppermost tabs 10a and lowermost tabs 10b, and tabs 10a,10b specifically identify the inserted tangible documents. Except as explicitly designated herein, preferably no additional rings, hooks, adhesives, adhesives, other mechanical components or other chemical components are necessary to retain and thereafter attach and maintain document holder 1 upon any flat surface or any curved surface.

Referring to FIGS. 1, 2, 3, 4 and 5 document holder 1 preferably comprises a single flat uppermost holder layer 8a and a single flat bottommost holder layer 8b. Each layer 8a and 8b preferably comprises 100% polyester fabric comprising (i) a polyvinyl chloride coating and (ii) an approximate one-eighth inch thickness. This preferred fabric is produced by Shason Textile and sold through Walmart, Inc. with a current manufacture part number: WS-B443-999, but other materials such as natural leather are also satisfactory. Each holder layer 8a, 8b is preferably the same identical longitudinal length 1b and width 1a of fully assembled document holder 1.

Preferably holder layers 8a, 8b congruently align with, and are adjacent to, each other along their respective surfaces 8c, 8d, 8e and 8f as described infra. Uppermost holder layer 8a and lowermost holder layer 8b are preferably each sufficiently flexible to conform to any flat surface 12a or curved surface 12b, and thereafter return to their original unstressed dimensions and physical configurations. However, both holder layers 8a, 8b preferably also each comprise sufficient stiffness so they do not sag when horizontally attached to a flat surface 12a or a curved surface 12b.

a. Tangible Document Compartments 3

Figure 4:
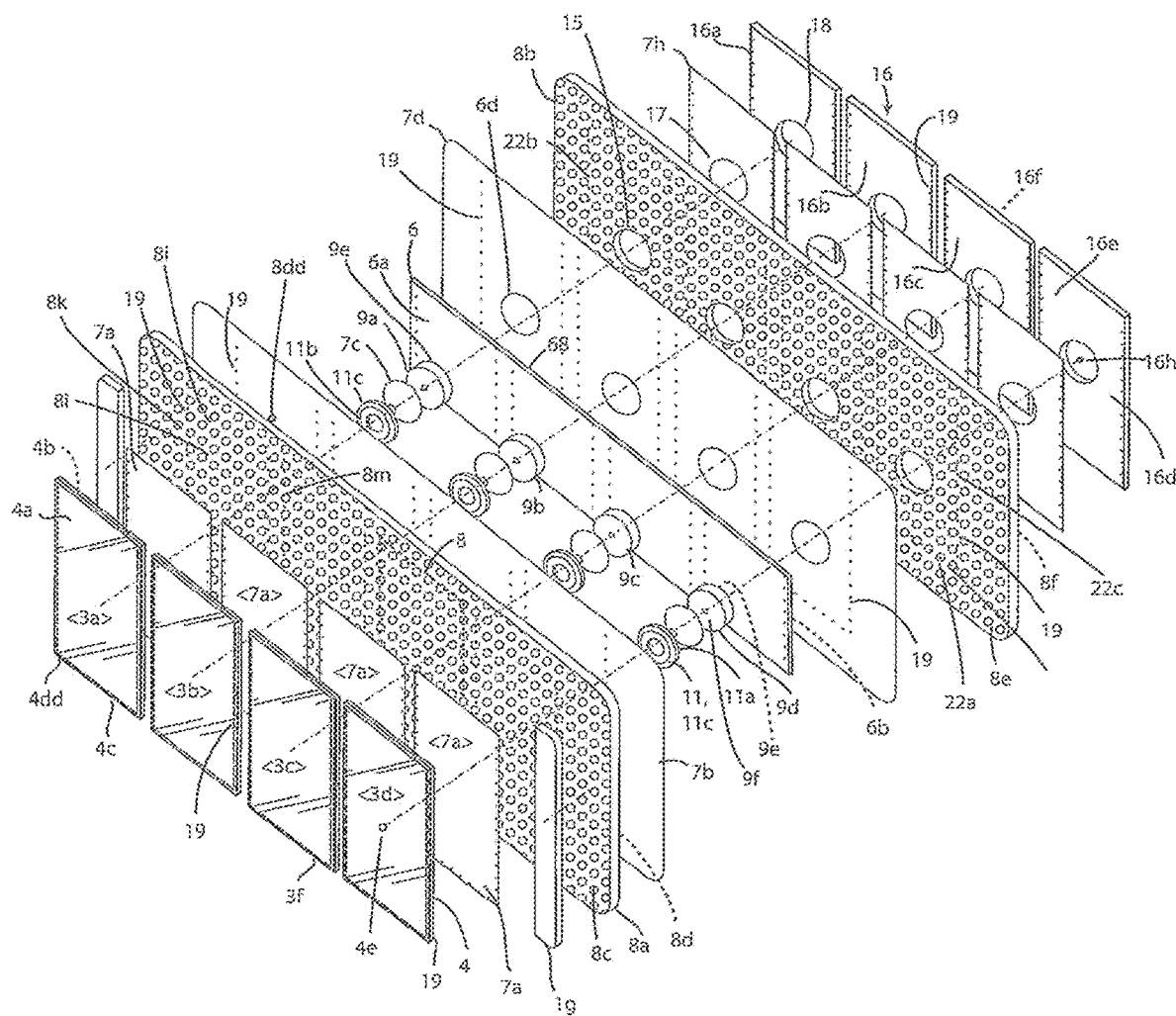
FIG. 4 is an exploded view of the preferred embodiment of FIG. 1.

Referring to FIGS. 1, 4 and 5, uppermost holder layer 8a preferably comprises a single anterior uppermost holder layer surface 8c and a single posterior uppermost holder layer surface 8d. Document holder 1 preferably comprises a first tangible document compartment 3a, second tangible document compartment 3b, third tangible document compartment 3c and fourth tangible document compartment 3d [collectively 'tangible document compartments 3']. Preferably each tangible document compartment 3 laterally and horizontally aligns with remaining adjacent tangible document compartments 3 along anterior uppermost holder layer surface 8c. Each tangible document compartment 3 is preferably rectangular in shape.

Still referring to FIGS. 1 and 5, when folded into two continuous sections which are preferably equal to each other in area, transparent compartment sheet 4 forms a single compartment anterior sheet side 4a and a single corresponding compartment posterior sheet side 4b. Each compartment sheet side 4a, 4b is preferably formed by folding along the width midline 4c of single compartment sheet 4. Compartment sheet sides 4a, 4b are preferably integral and continuous to each other, comprise the same dimensions as the other and are congruently align with each other. Each tangible document compartment 3 preferably comprises (i) a single anterior compartment sheet side 4a, (ii) a single posterior compartment sheet side 4b, and (iii) the area of anterior uppermost layer surface 8c that congruently aligns and is co-extensive with anterior transparent sheet surface 4a and posterior transparent sheet surface 4b.

Permanent attachment of each posterior compartment sheet side 4b to anterior uppermost holder layer surface 8c comprises a first adhesive layer 7a. Preferably each first adhesive layer 7a is separate and distinct from each remaining horizontally and laterally aligned layer 7a which adheres to remaining posterior compartment sheet sides 4b. Preferably first adhesive layer 7a comprises Loctite® super glue liquid model number IDH 1758930, and this adhesive may currently be purchased from Henkel IP & Holding GMBH LLC, Henkelstrasse 67 Duesseldorf Fed. Rep. Germany 40589. This preferred adhesive comprising first adhesive layer 7a contains 60% to 100% ethyl 2-cyanoacrylate. This preferred adhesive comprising first adhesive layers 7a also exhibits a/an (i) boiling point/range of over 149 Degrees Centigrade, (ii) vapor density of approximately 3, (iii) a flash point of 80 to 93.4 degrees Centigrade, (iv) a boiling point/range of over 149 degrees Centigrade (v) autoignition temperature of 485 degrees Centigrade and (vi) vapor pressure less than 0.2 mm Hg.

Each tangible document compartment 3 is preferably approximately (i) two and one-half inches in maximum width and (ii) three and three/quarters inches in longitudinal length. Each compartment anterior side 4a and compartment posterior side 4b preferably is also (i) transparent, approximately one/sixteenth inch in thickness, partially flexible in behavior, and
(ii) fabricated from a single flat smooth transparent sheet 4 with product number IV0192 from iVenus Computer Co., Ltd. at 110 Building, Longhua Shenzhen 518109, China, and available from Amazon.com under the brand name 'Shappy.' Each tangible document compartment 3 preferably comprises a single rectangular perimeter 3f.

Each rectangular perimeter 3f comprises a continuous running stitch 19 along each compartment longitudinal edges 3h, 3i and bottommost compartment edge 3j of each single corresponding rectangular perimeter 3f. Continuous running stitch 19 penetrates and thereby permanently attaches each tangible compartment edge 3i, 3h and 3j to adjoining uppermost holder layer 8a and lowermost holder layer 8b as described infra.

Preferably each tangible document compartment 3 is equal to each remaining tangible document compartment 3 in all dimensions. Each anterior compartment side 4a is preferably equal to each anterior compartment side 4a and posterior compartment side 4b of remaining tangible document compartments 3 in each and all dimensions and parameter measurements. Preferably but optionally, each tangible document compartment 3 is clearly designated by one uppermost tab 10a and one lowermost tab 10b. Each tab 10a, 10b preferably displays the name of an appropriate tangible document which inserts into a single corresponding tangible document compartment 3. Preferably each uppermost tab 10a along uppermost document holder edge 1h permanently adheres (i) to and between anterior transparent sheet segment 4a and posterior sheet segment 4b and
(ii) to posterior uppermost layer surface 8d.

Each lowermost tab 10b preferably attaches along lowermost document holder edge 1i by permanently adhering to posterior lowermost holder layer surface 8f and sticky segment posterior surface 16b as described infra. This permanent adhesion is preferably accomplished with the same adhesive that comprises first adhesive layer 7a as disclosed supra.

b. Snap Fasteners 11 and Magnetic Ring Disks 9

Referring to FIGS. 4 and 5, preferably positioned upon posterior uppermost holder layer surface 8d are at least four horizontally and laterally aligned preferably rigid snap fasteners 11a, 11b, 11c and 11d (collectively 'snap fasteners 11'). Preferably each single snap fastener 11 permanently adheres by second continuous adhesive layer 7b where adhesive layer 7b is continuously co-extensive with posterior uppermost layer surface 8d. Each single snap fastener 11 preferably adheres at the point of each corresponding area of posterior uppermost holder layer surface 8d that
  (i) congruently aligns with the center point 4e of a corresponding tangible document compartment 3
  (ii) along anterior uppermost holder layer surface 8c.

Each snap fastener 11 also preferably adheres to the posterior uppermost holder layer surface 8d so that thickness/height 11f of each snap fastener 11 is perpendicular to posterior uppermost holder layer surface 8d. Preferably second adhesive layer 7b is coextensive with the longitudinal length and width of uppermost document layer 8a and lowermost document layer 8b. Second adhesive layer 7b preferably comprises the identical adhesive described supra for first adhesive layer 7a.

Still referring to FIGS. 4 and 5, each snap fastener 11 preferably
  (i) is partially cylindrical, and
  (ii) exclusively comprises lower snap component 11c.

Each snap fastener 11 is preferably approximately (i) three-eighths inch in diameter and (ii) one-sixteenth inch in height/thickness 1f. Lowermost snap component 11c preferably comprises part of most preferred metal Dritz® Pearl snap fasteners item number 11076 and bar code 072879. These optimal snap fasteners 11 are currently available from Prym Consumer U.S.A., Inc., 950 Brisack Road, Spartanburg, S.C. 29304, www.dritz.com and at www.prym-consumer-usa.com/about/index.php. Each lower snap component 11c as disclosed in the pending document holder 1 preferably comprises
  (i) a single uppermost holder snap surface 11a and
  (ii) (ii) single lowermost holder snap surface 11b.

Each lower snap component 11c preferably adheres to posterior uppermost holder layer surface 8d along its lowermost snap fastener surface 11b with second adhesive layer 7b.

Referring to FIGS. 2, 3, 4 and 5, preferably there are at least four magnets 9a, 9b, 9c and 9d [collectively 'ring disk magnets 9'] and each magnet 9 preferably comprises a ring disk magnet 9. Each ring disk magnet 9 preferably
  (i) aligns with a corresponding single snap fastener 11 along a corresponding single uppermost snap fastener surface 11a, and
  (ii) permanently adheres to this same uppermost snap surface 11a by a single corresponding adhesive deposit 7c.

Each adhesive deposit 7c preferably comprises the identical adhesive as first adhesive layer 7a described supra. Each ring disk magnet 9 is preferably (i) cylindrical in total configuration (ii) approximately 0.375 inch in outer diameter (ii) approximately 0.125 inch in interior diameter and (iii) approximately 0.06-inch thickness/height. Optimal ring disk magnets 9 are currently designated model number REV 1610 Lot No. 07090, and these optimal ring disk magnets 9 are currently available from Master Magnetics, Inc., 1211 Atchison Court, Castle Rock, Colo. 80109.

As best seen in FIGS. 4 and 5, each ring disk magnet 9 permanently adheres to a corresponding snap fastener uppermost surface 11a at lowermost ring disk magnet surface 9f.

A single ring disk magnet 9 is preferably positioned at the center point 8ii of
  (i) each rectangular portion 8i of a single corresponding posterior uppermost holder layer surface 8d that
  (ii) congruently aligns with one corresponding tangible document compartment 3 along anterior uppermost holder surface 8c.

Most preferably each ring disk magnet 9 is also
  (i) equidistantly horizontally and laterally spaced from each adjoining magnetic ring disk magnet 9,
  (ii) perpendicular with respect to magnet thickness/height 9g to posterior uppermost holder layer surface 8d in assembled document holder 1, and
  (iii) axially aligned with and adhered to upper snap fastener surface 11a.

Composition and physical properties of the most preferred ring disk magnet 9 are as follows:

A. Composition

| Element | % By weight |
| --- | --- |
| neodymium | 28-33% |
| iron | 61-70 |
| boron | 0.5-1.5 |
| dysprosium | 1.5 to 5.0 |
| tellurium | 0.3-0.7 |

B. Physical Properties

This manufacturer of the preferred ring disk magnet 9 supra reports that, according to IATA DGR experiments, the maximum field strength of its single ring disk magnet 9 is not more than 0.418 A when observed at a distance of 2.1 im. The manufacturer also reports that M is less than 0.00525 GAUSS, or the compass needle is not more than two degrees. In the preferred embodiment, degradation of the rink disk magnets 9 by moisture is substantially reduced by enclosure of a ring disk magnet 9 between layers 8a and 8b in addition enclosure within a single flexible thin strip 6 as described infra.

c. Flexible Thin Strip 6 and Lowermost Holder Layer 8b

Referring to FIGS. 3, 4 and 5, preferably a single flexible thin strip 6 is positioned between uppermost holder layer 8a and lowermost holder layer 8b. More preferably flexible thin strip 6 comprises a separate rectangular cloth component that is physically distinct from all remaining document holder components, and which preferably is greater in longitudinal length 6g than width 6h. Preferably flexible thin strip 6 is also parallel along its longitudinal length 6g to document holder lowermost edge 1i and document holder uppermost edge 1h. Preferably flexible thin strip 6 (i) is not co-extensive with width 1a or longitudinal length 1b of uppermost holder layer 8a or lowermost holder layer 8b and (ii) therefore is smaller than uppermost and lowermost layers 8a, 8b in width and longitudinal length. Flexible thin strip 6 preferably (i) comprises cotton (ii) is approximately ten inches in longitudinal length, (iii) approximately one and three-quarters inches in width, and (iv) is approximately 1/16 inch in thickness.

Referring to FIG. 5, preferably flexible thin strip 6 is sufficient in longitudinal length and width to
  (i) completely and continuously cover, contact and tightly enclose each and all single uppermost disk ring magnet surfaces 9e, while (ii) extending over and adhering to posterior uppermost layer surface 8d and anterior lowermost layer surface 8e.

Preferably flexible thin strip 6 comprises an upper strip surface 6a and a lower strip surface 6b. Preferably upper strip surface 6a permanently adheres to posterior uppermost holder surface 8d with second adhesive layer 7b, and where adhesive layer 7b also preferably adheres snap fasteners 11, 11c. Preferably posterior uppermost holder layer surface 8d and lower strip surface 6b permanently attach to anterior lowermost holder layer surface 8e by fourth adhesive layer 7d. However, flexible thin strip 6 preferably does not adhere to ring disk magnets 9, and consequently fourth adhesive layer 7d preferably comprises non-adhesive circular openings 6d. Non-adhesive circular openings 6d preferably congruently align with corresponding ring disk magnet upper surfaces 9e. Preferably fourth adhesive layer 7d comprises the identical adhesive as first adhesive layer 7a described supra.

Referring to FIGS. 3, 4 and 5, preferably lowermost holder layer 8b

(i) comprises the same dimensions and materials as uppermost holder layer 8a, and (ii) is also sufficiently flexible yet stiff in the same manner as uppermost holder layer 8a.

Preferably lowermost holder layer 8b comprises a plurality of laterally aligned lowermost layer openings 15, and each opening 15 is preferably physically separate and distinct from remaining lowermost holder layer openings 15. Each lowermost holder layer opening 15 is also preferably circular in shape. The number of lowermost layer openings 15 preferably equals the number of ring disk magnets 9 which adhere to corresponding adhered snap fasteners 11. Lowermost holder layer 8b more preferably comprises at least four circular lowermost layer openings 15 in which each lowermost layer opening 15 congruently aligns with, and thereby exposes, a single protruding magnetic ring disk 9 covered with, or otherwise closed by, flexible thin strip 6. Each lowermost layer opening 15 also preferably congruently aligns with a single corresponding non-adhesive circular area 6d, and together they create a channel for an inserted single magnetic ring disk 9.

Lowermost layer openings 15 preferably each completely penetrate lowermost holder layer 8b from and through anterior lowermost holder layer surface 8e to and through posterior lowermost holder layer surface 8f. Preferably each single aligning and corresponding ring disk magnet 9 snugly protrudes through a single corresponding lowermost layer opening 15. Each ring disk magnet 9 also preferably remains covered by intervening single flexible thin strip 6 as each ring disk magnet 9 protrudes through a single corresponding lowermost layer opening 15. Preferably no adhesive deposit or adhesive layer contacts or adheres to (i) any ring disk magnet 9 or (ii) non-adhesive circular opening 6d.

As seen in FIGS. 1, 3, 4 and 5 a single physically separate running stitch 19 preferably inserts into lowermost edge 3j and longitudinal edges 3i, 3h of each tangible document compartment 3. Each running stitch 19 also preferably completely penetrates uppermost holder layer 8a along (i) the corresponding lowermost area edge 8n (not seen) and longitudinal area edges 8k, 8m of a corresponding area 8i along uppermost holder layer 8a that (ii) congruently forms part of a corresponding tangible document compartment 3. Preferably each running stitch 19 also penetrates lowermost holder layer 8b in a manner congruent to area 8i along anterior uppermost layer surface 8c when document holder 1 is completely assembled. Each running stitch 19 preferably thereby mechanically attaches tangible document compartments 3 to uppermost holder layer 8a and lowermost holder layer 8b.

d. Sticky Segments 16

Referring to FIGS. 2, 3, 4 and 5, preferably located upon posterior bottommost layer surface 8f, and permanently attaching to surface 8f are preferably at least four sticky segments 16a, 16b, 16c and 16d [collectively 'sticky segments 16']. Preferably each sticky segment 16 is (i) rectangular in shape, (ii) flexible, (iii) horizontally and laterally aligned with remaining adjacent sticky segments 16 along posterior lowermost holder surface 8f; and (iv) physically separate and distinct from remaining sticky segments 16.

Preferably each single sticky segment 16 is approximately (i) 3.0 inches in longitudinal length (ii) 2 and ⅜ inches in width and (iii) ⅛ inch in thickness. Each sticky segment 16 preferably comprises a single continuous smooth and flat segment anterior surface 16e and a single continuous smooth and flat segment posterior surface 16f. Each surface 16e, 16f may reversibly and repeatedly attach to a separate curved surface 12a or flat surface 12b. Surfaces 12a, 12b preferably comprise rigid materials which include although not exclusively, vinyl, other plastics, exposed metal, and painted or finished metal.

Preferably each single sticky segment anterior surface 16e permanently attaches to posterior lowermost layer surface 8f by one of a plurality of corresponding horizontally and laterally aligned physically separate and distinct fifth adhesive layers 7h. Preferably each fifth adhesive layer 7h comprises the identical longitudinal and width dimensions as each remaining fifth adhesive layer 7h and sticky segments 16. Each fifth adhesive layer 7h preferably comprises the identical adhesive as first adhesive layer 7a described supra. Preferably each fifth adhesive layer 7h also comprises a single posterior circular non-adhesive area 17 through which a single corresponding ring disk magnet 9 inserts within assembled document holder 1. Preferably sticky segments 16 laterally align with each other to form a linear series that is parallel to lowermost holder edge 1i in assembled document holder 1.

Preferred sticky segments 16 are non-corroding and sticky segments 16 exclusively comprise poly (ether urethane) existing in both liquid and solid phases. Preferred sticky segments 16 are renewably sticky by cleaning with soap and water and preferred sticky segments 16 do not comprise adhesives. Preferred sticky segments 16 also (i) are heat resistant from −15 degrees F. to 200-degree F., (ii) unaffected by the sun's radiation and (iii) leave no marks or residue when removed from any surface. Preferred sticky segments 16 retain their reversible and repeated attaching capability until the liquid poly (ether urethane) phase dissipates from the solid phase poly (ether urethane). Please see FIG. 9A (table with preferred materials description) and FIG. 9B (spectrum of preferred material composition).

The preferred poly (ether polyurethane) comprising sticky segments 16 exhibits stress/strain and peel values disclosed in FIGS. 8A and 8B for two separate samples of the same material. In particular the values of engineering stress/strain for preferred poly (ether urethane) are (i) 58.4 psi and 3.9 in/in in a first sample, and (ii) 83 psi and 4.9 in/in in a second sample. The values of true stress/strain are 285 psi and 1.58 in/in for sample 1; and 494 psi and 1.78 in/in in sample 2. Peel tests were conducted at 1, 5 and 20 inches per minute. Data from each of the two samples exhibited extreme rate sensitivity when tested at a variety of rates: Values of peel ranged from 2 at 1 inches/min, 4 at 5 inches/min. and 8 at 20 inches/min and exhibited extreme rate sensitivity. Poly (ether urethane) that exhibits these most preferred material composition spectrum, peel and stress/strain values are currently commercially available as UniqueX Fashion sticky pad dash mat cell phone holders. Currently these phone holders are designated under bar code X000YYC06F upon packaging when distributed by Amazon at https://www.amazon.com/UniqueX-Fashion-Detector-Accessories-Dashhboard/dp/BOIC.

Referring to FIGS. 4 and 5, each sticky segment 16 preferably simultaneously attaches to
  (i) posterior bottommost layer surface 8f along anterior sticky segment surface 16e with fifth adhesive layer 7h, and
  (ii) a separate curved or flat surface 12a, 12b along posterior segment surface 16f, and without an adhesive.

Most preferably sticky segments 16 each comprise a single segment circular opening 18 that congruently aligns with a single corresponding lowermost layer opening 15, a single corresponding aligned circular non-adhesive area 17, and a single corresponding aligned circular non-adhesive opening 6d. Together a single lowermost layer opening 15, circular on-adhesive opening 6d, circular non-adhesive area 17 and corresponding congruently aligning sticky segment opening 18 form a single continuous aperture whenever sticky segments 16 and posterior lowermost layer surface 8f adhere to each other in a completely assembled document holder 1.

As best seen in FIG. 5, each single corresponding ring disk magnet 9 preferably protrudes through this aperture, but each ring disk magnet uppermost surface 9a preferably is flush with sticky segment posterior surface 16f. Preferably each single sticky segment opening

18 snugly surrounds a single corresponding ring disk magnet uppermost surface 9a while ring disk magnet uppermost surface 9a is covered with flexible thin strip 6 at posterior segment lowermost surface 16f. Together magnetic disk uppermost surfaces 9a covered with flexible thin strip 6 and sticky segment posterior surfaces 16f preferably form a contacting flexible surface 8g that may directly contact and reversibly attach an assembled document holder 1 to curved surface 12a or flat surface 12b.

e. Attachment of Document Holder 1 to Curved Surfaces 12a and Flat Surfaces 12b

Referring to FIG. 5, flexible surface 8g preferably firmly and repeatedly attaches to, and is reversibly and repeatedly removable from, curved or flat surfaces in a continuous contacting manner. Flexible surface 8g also preferably securely repeatedly attaches to, and is reversibly and repeatedly removable from: vinyl, glass, metal or painted metal surfaces and other rigid curved surfaces or flat surfaces 12a, 12b. More preferably document holder 1 reversibly and repeatedly attaches at contacting flexible surface 8g to a vehicle exterior flat or curved surface 13b or a vehicle interior flat or curved surface 13a. For a vehicle exterior flat or curved surface 13b, document holder 1 preferably attaches between
  (i) driver side door window exterior lowermost lateral edge 20b, and
  (ii) crown 20c along the driver side exterior door surface 13b.

For this preferred attachment crown 20c preferably comprises and approximates a single straight-line segment
  (i) located below vehicle driver's side door window exterior lowermost lateral edge 20b, and
  (ii) extending from vehicle driver side door's vertical anterior exterior edge 18e to vehicle driver's door handle 24.

For this preferred attachment, driver side door window exterior lowermost lateral edge 20b is
  (i) perpendicular to vehicle driver side door's anterior vertical exterior edge 18e, and where
  (ii) edge 18e approximates a straight-line segment that is perpendicular to the supporting surface on which the vehicle rests.

Referring to FIG. 6, document holder 1 most preferably attaches to vehicle exterior surface 13b that is curved or flat, with all uppermost magnet surfaces 9a each attaching approximately one and one-half inches below driver door window lowermost lateral exterior edge 20b. Preferably each uppermost magnet surface 9a attaches to vehicle exterior surface 13b (i) in a lateral and horizontal manner to remaining uppermost magnet surfaces 9a, and (ii) parallel to driver's door window lowermost exterior lateral edge 20b.

When vehicle exterior surface 13b below the driver's side vehicle door window lowermost exterior lateral edge 20b is curved, there is a preferred range of curves for attachment of preferred assembled document holder 1. This preferred range of curvature of the vehicle driver's side door exterior surface 13b to which document holder 1 attaches is approximated by a series of adjoining parallel outwardly convex curve segments S, and where
  (i) the first of the two most exterior points of a curve segment S is located along driver door lowermost window lateral exterior edge 20b and the remaining most exterior point of this same curve segment is located along crown 20c; and
  (ii) where the straight-line segment connecting these two points and superimposed along this same curve segment S is perpendicular to vehicle driver door window lowermost lateral exterior edge 20b; and
  (iii) where driver's door window lowermost lateral exterior edge 20b is perpendicular to vehicle driver door anterior exterior vertical edge 18e, and
  (iv) where vehicle driver door anterior exterior vertical edge 18e approximates a straight vertical line segment that is perpendicular to a flat support surface.

Using the above parameters, curve segment length SL for each of a series of parallel curve segments S along a vehicle drive door exterior surface 13b is preferably empirically measured,
  (i) along three different vehicle models; and
  (ii) from a first point along vehicle driver's side door window lowermost exterior edge 20b to
  (iii) a corresponding second point along crown 20c for each vehicle, so
  (iv) a single straight-line segment connecting these two points is perpendicular to vehicle driver side door window exterior lowermost edge 20b.

These quantified curve segment lengths SL as disclosed infra comprise the preferred range of quantified values for optimal attachment of document holder 1 to curved or flat surface 13a, 13b
  (i) for a series of curve segments that approximates the vehicle exterior surface contour between the vehicle driver side view mirror 26 and door handle 24 along the driver's side door, and
  (ii) at which document holder 1 will manually quickly and securely attach in approximately five seconds when removed and transferred from a previous location within the vehicle interior. Please see Tables I, II and III infra.

For this preferred range, each curve segment length SL comprises the average value of curve segments lengths SL1, SL2 and SL3 for measurements taken a quantified linear distance from vehicle door anterior exterior vertical edge 18e. The angle of divergence for Table I, Toyota Corolla LE 2017 between crown 20c and vehicle driver's door exterior vertical anterior edge 18e is preferably approximately −0.25 degrees. The angle of convergence for Table II, Subaru Legacy 2015 between crown 20c and vehicle driver's door exterior vertical anterior edge 18e is preferably approximately 1.46 degrees, while the angle of convergence for Table III, Ford Escape 2018 between crown 20c and vehicle driver's door exterior vertical anterior edge 18e is preferably approximately 1.09 degrees.

TABLE 1

[Toyota Corolla 2017]

| | SL1 | SL2 | SL3 | SL* |
|---|---|---|---|---|
| 5 and ½* | 5 and 1/16 | 5 and 1/16 | 5 and 1/16 | 5 and 1/16 |
| 22 | 5 and 3/16 | 5 and ¼ | 5 and ¼ | 5 and 11/48 |
| 11 | 5 and ⅛ | 5 and ¼ | 5 and ¼ | 5 and 5/24 |
| 31 | 5 and ⅛ | 5 and ¼ | 5 and ¼ | 5 and 5/24 |
| 16 and ½ | 5 and ⅛ | 5 and ¼ | 5 and ¼ | 5 and 5/24 |
| 26 and ½ | 5 and ⅛ | 5 and ½ | 5 and ¼ | 5 and 7/24 |
| 19 | 5 and ⅛ | 5 and ¼ | 5 and ¼ | 5 and 5/24 |
| 9 | 5 and ⅛ | 5 and ¼ | 5 and ¼ | 5 and 5/24 |
| 28 | 5 and ¼ | 5 and ¼ | 5 and ¼ | 5 and ¼ |
| 13 | 5 and ⅛ | 5 and ⅛ | 5 and ⅛ | 5 and ⅛ |

*Number of inches from vehicle driver's side door anterior vertical exterior edge 18e along driver's side window exterior lowermost lateral edge 20b.
**Curve segment lengths SL1, SL2, SL3 and SL are each measured in inches.
***SL is the average value of SL1, SL2 and SL3.

TABLE II

[Subaru Legacy 2015]

| | SL1** | SL2 | SL3 | SL*** |
|---|---|---|---|---|
| 6* | 5 and ⅝ | 5 and ¾ | 5 and 11/16 | 5 and 11/16 |
| 16 | 5 and ½ | 5 and ¼ | 5 and ⅜ | 5 and ⅜ |
| 22 and ½ | 5 and ⅛ | 5 and ¼ | 5 and ⅛ | 5 and 13/24 |
| 30 | 5 and ½ | 5 and ⅛ | 5 and ⅛ | 5 and ¼ |
| 13 | 5 and ⅝ | 5 and ½ | 5 and ½ | 5 and 13/24 |
| 19 | 5 and ⅜ | 5 and ⅜ | 5 and ⅜ | 5 and ⅜ |
| 28 | 5 and ⅛ | 5 and ⅛ | 5 and ⅛ | 5 and ⅛ |
| 17 and ½ | 5 and ⅜ | 5 and ⅜ | 5 and ¼ | 5 and ⅓ |
| 20 | 5 and ¼ | 5 and ⅜ | 5 and ⅜ | 5 and ⅓ |
| 32 | 5 and ⅛ | 5 and ⅛ | 5 and ⅛ | 5 and ⅛ |

*Number of inches from driver's side door exterior vertical anterior edge 18e along driver's side window lowermost exterior lateral edge 20b.
**Curve segment lengths SL1, SL2, SL3 and SL are measured in inches.
***SL is the average value of SL1, SL2 and SL3.

TABLE III

[Ford Escape 2018]

| | **SL1 | SL2 | SL3 | ***SL |
|---|---|---|---|---|
| *6 | 5 and ¾ | 5 and ¾ | 5 and ¾ | 5 and ¾ |
| 16 | 5 and ½ | 5 and ½ | 5 and ½ | 5 and ½ |
| 22 and ½ | 5 and ⅜ | 5 and ⅜ | 5 and ⅜ | 5 and ⅜ |
| 26 | 5 and ⅜ | 5 and ⅜ | 5 and ⅜ | 5 and ⅜ |
| 13 | 5 and ½ | 5 and ½ | 5 and ½ | 5 and ½ |
| 19 | 5 and ⅜ | 5 and 7/16 | 5 and ⅜ | 5 and 19/48 |
| 28 | 5 and ¼ | 5 and ⅜ | 5 and ⅜ | 5 and ⅓ |
| 17 and ½ | 5 and ½ | 5 and ⅜ | 5 and 7/16 | 5 and 7/16 |
| 9 | 15 and ⅝ | 5 and ½ | 5 and ⅝ | 5 and 7/12 |
| 11 | 5 and ⅝ | 5 and ⅝ | 5 and ⅝ | 5 and ⅝ |

*Number of inches from driver's side door exterior vertical anterior edge 18e along 20c driver's side window lowermost exterior lateral edge 20b.
**Curve segment lengths SL are each measured in inches.
***SL is the average value of SL1, SL2 and SL3.

f. Method of Use of Document Holder 1

A portable document holder 1 is recommended whenever a person will view, read and/or physically access tangible documents (i) in horizontal and lateral alignment to each other, and
(ii) where document holder 1 may be attached to, and then manually removed from, a curved or flat surface interior 12a,12b to a building or fixture, or
(ii) a curved or flat surface 12a, 12b that is exterior to a building, vehicle or fixture.

As seen in FIG. 7, in a preferred utility document holder 1 reversibly and/or repeatedly manually attaches to a curved or flat interior vehicle surface 13a. In this preferred utility, interior vehicle surface 13a may preferably comprise a material, such as but not exclusively vinyl, and which reversibly and repeatedly attaches to sticky segments 16.

Document holder 1 may then be manually removed and reattached to another curved or flat interior vehicle surface 13a in a repetitive manner, and where assembled posterior lowermost holder surface 8g flexibly conforms, and attaches, to surface 13a. With sticky segments 16, document holder 1 may be repeatedly reapplied to, and then removed from, a series of vehicle interior curved or flat surfaces 13a. By attachment to the appropriate vehicle interior surface 13a, tangible documents 4 within tangible document compartments 3 of document holder 1 are clearly viewed by
(i) the driver or
(ii) a third person positioned adjacent and exterior to the vehicle at driver's side door window 20.

Because there is no adhesive component to sticky segments 16, there is no residue remaining after removal from any vehicle interior surface 13a (or exterior vehicle surface 13b).

In an even more preferred utility, document holder 1 reversibly and repeatedly attaches to an exterior vehicle door surface 13b that is curved or flat. Most preferably, when attached adjacent and parallel to driver side window exterior lateral lowermost edge 20b, document holder 1 and inserted tangible documents are clearly viewed by both (i) the driver and (ii) a third person positioned exterior to driver's side door window 20. Visualization by either this exterior third person or the driver remaining within the vehicle occurs without manually retrieving tangible documents for the third person to physically access and/or read.

For the most preferred utility, the driver initially attaches assembled document holder 1 to an interior curved or flat vehicle surface 13a. When the driver becomes aware of a third person's approach, he or she immediately stops the vehicle in a safe location. The driver or passenger within the vehicle immediately removes document holder 1 from interior vehicle surface 13a. He or she then immediately reattaches document holder 1 upon vehicle door exterior surface 13b adjacent and parallel to driver side exterior window lateral lowermost edge 20b. This removal and reattachment of document holder 1 preferably should not require more than five seconds.

At this time preferably, document holder 1 optimally attaches immediately below the vehicle driver door window 20 in a horizontal/lateral orientation. In this orientation and position, tangible documents within attached document holder 1 are easily identified and/or read by the exteriorly positioned third person. Ring disk magnets 9 are optimal as attachment to exterior surfaces 13b that are either curved or flat, because most vehicle exterior surfaces comprise metal with magnetic properties. However, the vehicle exterior surfaces 13b will not experience damage to paint or finishes by ring disk magnets 9 or other magnetic components, because magnetic ring disks 9 are each completely and individually enclosed by flexible thin strip 6. Sticky segments 6 will attach in particular to rigid plastic surfaces such as vehicle interior vinyl moldings.

g. Construction of the Preferred Portable Document Holder 1

The best mode of creating the most preferred document holder 1 is as follows:

a. The operator initially selects a flexible transparent sheet 4 of appropriate thickness, longitudinal length and width.

b. The operator initially folds flexible transparent sheet 4 to form an anterior sheet side 4*a* and a posterior sheet side 4*b*.

c. The operator then permanently adheres posterior sheet side 4*b* to a premeasured rectangular area of the upper surface of a flat, integral and flexible sheet which becomes uppermost holder layer 8*a*.

d. Each single adhered segment comprising sides 4*a*, 4*b*, and combined with the corresponding congruently aligning area of anterior uppermost layer surface 8*c*, now comprises a single tangible document compartment 3.

e. On the posterior surface of this same flat integral material that is now uppermost holder layer 8*a*, the operator applies a layer of adhesive 7*b*.

f. The operator next permanently adheres single snap fasteners 11 in horizontal and lateral alignment with each other along adhesive layer 7*b* upon posterior uppermost holder layer surface 8*d*, and with each snap fastener 11 protruding from surface 8*d* in a perpendicular manner.

g. The lowermost ring disk magnet surface 9*f* of a single ring disk magnet 9 is next permanently and vertically adhered to one corresponding and previously adhered uppermost snap fastener surface 11*a* with a single adhesive deposit 7*c*. This process is repeated for all snap fasteners 11, so the resulting alignment of snap fasteners 11 with laterally adjoining adhered ring disk magnets 9 is parallel to the longitudinal length of uppermost holder layer 8*a*.

h. The operator then adheres single thin flexible strip 6 to posterior uppermost layer surface 8*d* so that strip 6 encloses adhered ring disk magnets 9.

i. Another adhesive layer 7*d* is then applied to anterior lowermost holder layer surface 8*e*, except for circular non-adhesive openings 6*d* which should congruently align with corresponding ring disk magnets 9.

j. Single flexible strip 6 is then permanently adhered to anterior lowermost holder layer surface 8*e* except for non-adhesive openings 6*d*.

k. Each ring disk magnet 9 should now protrude through a corresponding single non-adhesive area 6*d*.

l. The operator next creates a series of single, and preferably circular, openings 15 that each completely penetrates a sheet of appropriate material that becomes lowermost holder layer 8*b*. Preferably this material is cut to the same dimensions, and comprises the same material composition and surface features, as uppermost holder layer 8*a*.

m. Each circular opening 15 is then congruently aligned with a single corresponding ring disk magnet 9 covered by flexible thin strip 6. Each ring disk magnet 9 should now protrude through a corresponding single non-adhesive opening 6*d* and a single aligned circular opening 15.

n. The operator insures that posterior uppermost layer surface 8*d* is continuously adhered to anterior lowermost layer surface 8*e* (except for non-adhesive openings 6*d*) by adhesive layer 7*b* and adhesive layer 7*d* continuously contacting and adhering to each other.

o. The operator next prepares sticky segments 16 to place in lateral adjoining alignment with each other along posterior lowermost holder surface 8*f*.

p. The operator next cuts a single sticky segment aperture 18 at the center point of each corresponding sticky segment 16. Preferably each sticky segment aperture 18 should be
  (i) sufficient in dimension to snugly contain a single corresponding covered magnetic rink disk 9, and
  (ii) circular in shape.

q. The operator then applies a series of physically separate continuous adhesive layers 7*h* to each of several adjoining but physically separate areas along posterior lowermost holder layer surface 8*f*. Preferably each adhesive layer 7*h* is identical to remaining adhesive layers in dimensions and material composition.

r. The operator then permanently adheres each sticky segment 16 along posterior lowermost holder layer surface 8*f* by a single corresponding adhesive layer 7*h*. Each sticky segment longitudinal side 16*g* should be parallel to adjoining laterally aligning sticky segment longitudinal sides 16*g*. Each sticky segment 16 is also adhered and positioned along posterior bottommost holder layer surface 8*f* in lateral and horizontal alignment with adjoining sticky segments 16.

t. Each uppermost ring disk magnetic surface 9*e*, together with its corresponding cover of flexible thin strip 6, now should penetrate a corresponding single sticky segment aperture 18 whenever this same sticky segment 16 permanently adheres to posterior lowermost holder layer surface 8*f*.

u. Each covered ring disk magnet uppermost surface 9*a* should also be flush with sticky segment posterior surface 16*f*. In this manner, each covered ring disk magnet uppermost surface 9*e* does not protrude beyond sticky segment posterior surface 16*d*.

v. Preferably each permanently adhered sticky segment center point 16*h* should also congruently align with a single corresponding tangible document compartment center point 4*e* along anterior uppermost holder layer surface 8*c*.

w. The operator then applies a single thread running stitch 19 exclusively to longitudinal edges 3*h*, 3*i* and bottommost edge 3*j* of each tangible document compartment 3. Each thread running stitch 19 should continuously and completely penetrate each anterior compartment surface 4*a* and posterior compartment surface 4*b*, as well as those areas of holder layer 8*a* and lowermost holder layer 8*b* which correspond to the same dimensions as corresponding tangible document compartment 3.

x. Optionally, and prior to permanently adhering the above described components to each other, the operator may adhere or otherwise attach identifying labels 10*a*, 19*b* to bottommost holder edge 1*i* and upper holder edge 1*h* of document holder 1. Flat tabs or other surfaces 1*g* comprising florescent material may be adhered or otherwise attached.

The above text, in which like reference numbers designate identical parts throughout the pending specification and drawings, describes the preferred embodiment and other embodiments for the above disclosed document holder 1, as well as the best mode of their applications. However, those skilled in this art may envision other possible variations within the invention's scope. Accordingly, since the document holder 1 invention is possible in other specific forms without departing from the sprit or essential characteristic

The invention claimed is:

1. A portable document holder, said portable document holder comprising a contacting surface, said contacting surface reversibly and repeatedly attaching to a physically separate flat surface, or
   said contacting surface reversibly and repeatedly attaching to a physically separate curved surface,
   said physically separate flat surface and said physically separate curved surface each not comprising part of said portable document holder,
   said portable document holder comprising a bottommost holder layer and an uppermost holder layer,
   said bottommost holder layer comprising an anterior bottommost holder layer surface and a posterior bottommost holder layer surface, and
   said uppermost holder layer comprising an anterior uppermost holder layer surface and a posterior uppermost holder layer surface,
   said uppermost holder layer and said lowermost holder layer being congruently aligned with each other,
   said contacting surface comprising a contacting flexible layer and reversibly repeatedly attaching components, and
   said portable card holder further comprising magnetic components, and each said magnetic component being partially covered by said contacting flexible layer, and
   said contacting flexible layer and each said reversibly repeatedly attaching component contacting said physically separate curved surface or said physically separate flat surface,
   said portable document holder comprising tangible document compartments wherein said tangible document compartments are in lateral alignment with remaining said tangible document compartments,
   said portable document holder further comprising magnet component attaching devices, and each said magnetic component adhering to a corresponding single said magnet component attaching device,
   said magnetic component attaching devices adhering to said posterior uppermost holder layer surface, and
   said magnetic components inserting into said lowermost holder layer.

2. A portable document holder comprising a contacting surface, said contacting surface reversibly and repeatedly attaching to a physically separate flat surface, or said contacting surface reversibly and repeatedly attaching to a physically separate curved surface,
   said physically separate flat surface and said physically separate curved surface each not comprising part of said portable document holder,
   said portable document holder comprising a bottommost holder layer and an uppermost holder layer,
   said bottommost holder layer comprising an anterior bottommost holder layer surface and a posterior bottommost holder layer surface, and
   said uppermost holder layer comprising an anterior uppermost holder layer surface and a posterior uppermost holder layer surface,
   said uppermost holder layer and said lowermost holder layer being congruently aligned with each other,
   said contacting surface comprising a contacting flexible layer and reversibly repeatedly attaching components, and
   said portable card holder further comprising magnetic components, and each said magnetic component being covered by said contacting flexible layer, and
   said contacting flexible layer and each said reversibly repeatedly attaching component contacting said physically separate curved surface or said physically separate flat surface,
   said portable document holder comprising tangible document compartments, said tangible document compartments each being in lateral alignment with remaining said tangible document compartments,
   said flexible layer comprising a flexible thin strip and said reversibly repeatedly attaching components comprising sticky segments, said sticky segments each comprising a sticky segment anterior surface and a sticky segment posterior surface,
   said flexible thin strip adhering to said uppermost holder layer and said lowermost holder layer,
   said flexible thin strip enclosing said magnetic components, and
   said flexible thin strip being flush with said sticky segment posterior surfaces.

3. A portable document holder, said portable document holder comprising a contacting surface, said contacting surface reversibly and repeatedly attaching to a physically separate flat surface, or
   said contacting surface reversibly and repeatedly attaching to a physically separate curved surface,
   said physically separate flat surface and said physically separate curved surface each not comprising part of said portable document holder,
   said portable document holder comprising a bottommost holder layer and an uppermost holder layer,
   said bottommost holder layer comprising an anterior bottommost holder layer surface and a posterior bottommost holder layer surface, and
   said uppermost holder layer comprising an anterior uppermost holder layer surface and a posterior uppermost holder layer surface,
   said uppermost holder layer and said lowermost holder layer being congruently aligned with each other,
   said contacting surface comprising a contacting flexible layer and reversibly repeatedly attaching components, and
   said portable card holder further comprising magnetic components, and each said magnetic component being partially covered by said contacting flexible layer, and
   said contacting flexible layer and each said reversibly repeatedly attaching component contacting said physically separate curved surface or said physically separate flat surface,
   said portable document holder comprising tangible document compartments wherein said tangible document compartments are each in lateral alignment with remaining said tangible document compartments, and
   said portable document holder comprising magnet component attaching devices, and
   each said magnet component attaching device comprising one component of a snap fastener.

4. A portable document holder comprising a contacting surface, said contacting surface reversibly and repeatedly attaching to a physically separate flat surface, or
   said contacting surface reversibly and repeatedly attaching to a physically separate curved surface,
   said physically separate flat surface and said physically separate curved surface each not comprising part of said portable document holder, said portable document holder comprising a bottommost holder layer and an uppermost holder layer, said bottommost holder layer comprising an anterior bottommost holder layer surface and a posterior bottommost holder layer surface, and said uppermost holder layer comprising an anterior uppermost holder layer surface and a posterior uppermost holder layer surface, said uppermost holder layer and said lowermost holder layer being congruently aligned with each other, said contacting surface comprising a contacting flexible layer and reversibly repeatedly attaching components, and said portable card holder further comprising magnetic components, and each said magnetic component being partially covered by said contacting flexible layer, and said contacting flexible layer and each said reversibly repeatedly attaching component contacting said physically separate curved surface or said physically separate flat surface, said portable document holder comprising tangible document compartments and said tangible document compartments each being in lateral alignment with remaining said tangible document compartments, and said reversibly repeatedly attaching components comprising sticky segments, and said magnetic components protruding through said lowermost document layer and inserting into said sticky segments.

5. A portable document holder, said portable document holder comprising a contacting surface, said contacting surface reversibly and repeatedly attaching to a physically separate flat surface, or said contacting surface reversibly and repeatedly attaching to a physically separate curved surface, said physically separate flat surface and said physically separate curved surface each not comprising part of said portable document holder, said portable document holder comprising a bottommost holder layer and an uppermost holder layer, said bottommost holder layer comprising an anterior bottommost holder layer surface and a posterior bottommost holder layer surface, and said uppermost holder layer comprising an anterior uppermost holder layer surface and a posterior uppermost holder layer surface, said uppermost holder layer and said lowermost holder layer being congruently aligned with each other, said contacting surface comprising a contacting flexible layer and reversibly repeatedly attaching components, and said portable card holder further comprising magnetic components, and each said magnetic component being partially covered by said contacting flexible layer, and said contacting flexible layer and each said reversibly repeatedly attaching component contacting said physically separate curved surface or said physically separate flat surface, said portable document holder comprising tangible document compartments, said tangible document compartments each being in lateral alignment with remaining said tangible document compartments, said portable document holder further comprising magnet component attaching devices, and each said magnetic component adhering to a corresponding single said magnet component attaching device, and each said magnet component attaching devices comprising at least one component of a snap fastener.

* * * * *